United States Patent [19]
Stanwell-Smith et al.

[11] 4,026,611
[45] May 31, 1977

[54] BEARING ARRANGEMENT

[75] Inventors: Colin Howard Stanwell-Smith, Cambridge; John Alfred William Aldous, Huntingdon, both of England

[73] Assignee: Strathearn Audio Limited, Belfast, Northern Ireland

[22] Filed: Dec. 3, 1975

[21] Appl. No.: 637,182

[30] Foreign Application Priority Data
Dec. 4, 1974 United Kingdom ............ 52517/74

[52] U.S. Cl. .............................. 308/15; 308/237 R
[51] Int. Cl.² ........................................ F16C 13/00
[58] Field of Search ............... 308/8, 15, 22, 26, 28, 308/29, 33, 37, 58, 63, 70, 72, 140, 237 R, 238; 108/139, 141; 226/194; 274/9 R, 39 R, 39 A

[56] References Cited
UNITED STATES PATENTS
3,565,496  2/1971  Latussek et al. .................... 308/26

Primary Examiner—Joseph F. Peters, Jr.
Assistant Examiner—Gene A. Church
Attorney, Agent, or Firm—Cushman, Darby & Cushman

[57] ABSTRACT

A bearing arrangement for a spindle including a bush having tapered ends and members having internally tapered surfaces arranged to cooperate with the tapered ends, and means to clamp the members towards one another upon the bush to support a spindle passing through the bush.

5 Claims, 2 Drawing Figures

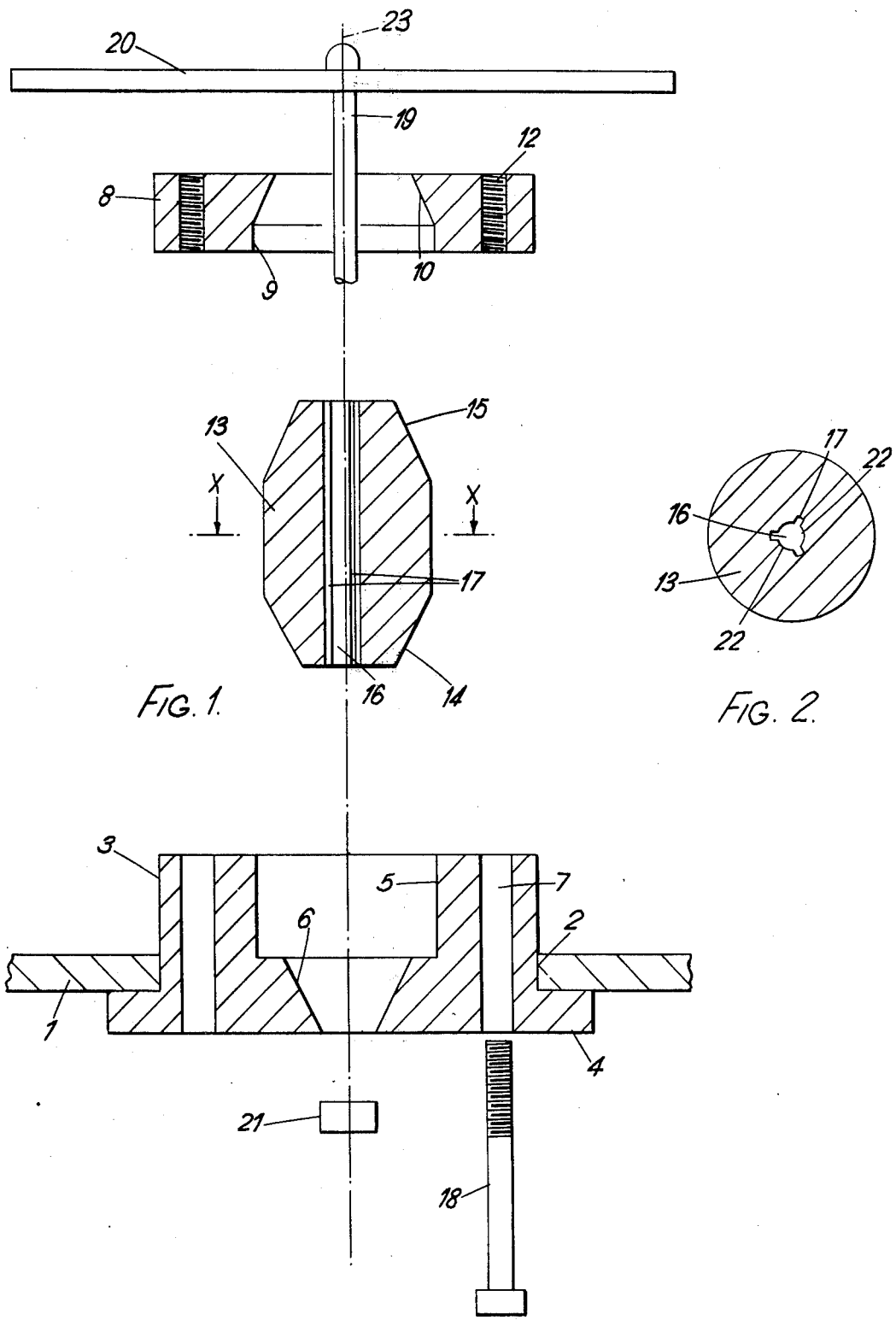

BEARING ARRANGEMENT

This invention relates to a rotatable bearing arrangement which is of particular, though not exclusive, application to phonograph turntables. It is a requirement that phonograph turntables should be accurately located and should operate with a minimum of noise.

The present invention provides a bearing arrangement which is capable of easy adjustment in order to minimize sideways play and which provides a plurality of equally spaced areas of contact with a spindle in order to minimize noise, for example "rumble".

An embodiment of the invention will now be described, by way of example, with reference to the accompanying drawing in which:-

FIG. 1 is an exploded vertical cross-sectional view of a bearing arrangement and FIG. 2 is a horizontal cross section through a part of the arrangement shown in FIG. 1.

Referring to the drawing, there is shown a phonograph chassis 1 having a hole 2 through which a base 3 of a bearing arrangement extends. The base 3, which is attached to the chassis 1 by a flange portion 4, has a central hole 5 with a portion 6 which tapers inwardly as it extends downwardly. Fixing holes 7 also extend through the base 3. The bearing arrangement further includes an upper portion 8 having a central hole 9 with an upwardly extending inwardly tapering portion 10. Threaded holes 12 extend through the part 8 and are arranged in such a way that they can be aligned with the holes 7 in the base 3. Between the base 3 and the upper part 8, there is an element 13 having an externally tapered portion 14 which cooperates with the internally tapered portion 6 of the base 3 and an externally tapered portion 15 which cooperates with the internally tapered portion 10 of the upper part 8. The element 13 has a central longitudinal hole 16 with longitudinally extending grooves 17.

The bearing assembly constituted by the base 3, the upper portion 8 and the element 13 can be assembled by means of threaded bolts 18 which pass through the holes 7 of the base 3 into the threaded holes 12 of the upper part 8. In using the bearing assembly to guide a phonograph turntable, a shaft 19 of a turntable 20 is passed through the hole 16 in the element 13 until it reaches a thrust pad 21, which may be included in the base 3 in such a way that it carries the end load of the shaft 19. The bolts 18 are then tightened in such a way that bearing surfaces 22 of the hole 16 close on to the shaft 19 and support the shaft 19 in such a way that it is freely rotatable with respect to the surfaces 22 about a required vertical axis 23. The grooves 17 in the side of the hole 16 help this action, of the closure of the surfaces formed by the side of the hole 16 upon the shaft 19, to occur symmetrically.

In the particular embodiment described, the element 13 is made of a graphite loaded porous phosphor bronze sintered material which is suitably rigid, which has inherent lubrication to some degree and which is capable of absorbing any liquid lubricant that may be applied to the bearing. It will be understood that other bearing materials can be used, but it has been found that a material which is more rigid than a plastics bearing material is to be preferred for guiding the shaft of a phonograph turntable. It is also preferred that the threaded bolts 18 should be of a resilient material, such as nylon, so that by tightening them in such a way that they are elastically strained, any wear of the bearing surfaces can be automatically compensated for by the self-induced relaxation of the tension in the bolts.

It will also be appreciated that the bearing arrangement can be adjusted by tightening the bolts 18 until there is no sideways play of the shaft 19 and that excessive bearing wear can be adjusted out by the retightening of the clamping bolts 18. It will also be seen that the longitudinal axis of the shaft 19 will remain in the same relative position to the base 3 during any such adjustment.

The three internal grooves 17 in the side of the hole 16 provide a reservoir for lubricant and, by defining three distinct and equally spaced bearing surfaces 22, "rumble" is reduced.

It will be appreciated that although the invention has been described with reference to a particular embodiment, variations and modifications can be made within the scope of the invention.

For example inwardly directed radial forces could be exerted on the element 13 by means other than the base part 3 and the upper part 8.

We claim:

1. A bearing assembly for a shaft including a first integral member defining bearing surfaces for the shaft, a tapered outer surface at each end of the first member, second and third members each defining an internally tapered surface arranged to cooperate with a respective one of the tapered outer surfaces and adjustable clamp means arranged to clamp the second and third members towards one another and to exert pressure upon the first member to cause the bearing surfaces to be moved towards a common axis, whereby the bearing surfaces can be adjusted to support a rotatable shaft therein.

2. A bearing assembly as claimed in claim 1, the said bearing surfaces being defined by an inner surface of the member, concentric with the said axis, including recessed portions of the said inner surface extending parallel to the said axis and separating the said bearing surfaces from one another.

3. A bearing assembly as claimed in claim 1 including a body made of graphite loaded porous phosphor bronze constituting the said member.

4. A bearing assembly as claimed in claim 1, including a plurality of threaded members arranged to clamp the second and third members towards one another.

5. A bearing assembly as claimed in claim 4 wherein the means to exert pressure includes a resilient member under tension which relaxes to maintain pressure between the members in the event of wear of the bearing surfaces.

* * * * *